US005978436A

United States Patent [19]

Lohse et al.

[11] Patent Number: 5,978,436

[45] Date of Patent: Nov. 2, 1999

[54] DEVICE FOR ELECTRONICALLY SIMULATING THE POSITION OF A COMPONENT

[75] Inventors: Mathias Lohse, Stuttgart; Frank-Thomas Eitrich, Reutlingen, both of Germany; Patrick Hynes, Fontainebleau, France

[73] Assignee: Robert Bosch GmbH, Stuttgart, Germany

[21] Appl. No.: 08/446,590

[22] Filed: May 15, 1995

Related U.S. Application Data

[63] Continuation of application No. PCT/DE94/01011, Sep. 2, 1993, abandoned.

[30] Foreign Application Priority Data

Sep. 15, 1993 [DE] Germany ............................ 43 31 226

[51] Int. Cl.[6] ...................................................... G01M 3/00

[52] U.S. Cl. ............................................................... 377/17

[58] Field of Search ................................................ 377/17

[56] References Cited

U.S. PATENT DOCUMENTS 4,787,354 11/1988 Wilens et al. ............................ 327/20
5,317,614 5/1994 Davis et al. .............................. 377/17

FOREIGN PATENT DOCUMENTS

0495352A2 1/1992 European Pat. Off. .

*Primary Examiner*—Margaret Rose Wambach
*Attorney, Agent, or Firm*—Michael J. Striker

[57] ABSTRACT

The device for electronically simulating a component position includes a first counter (40,42) which counts counter pulses (Zt) determined by respective occurrences of a periodic event marking respective component positions; a second counter (30) which, in response to occurrence of a first event (e2), starts a third counter (34) which counts at a counting rate faster than that of the second counter (30) so as to repeatedly run through a predetermined value range (Z') until occurrence of a subsequent event (e3) and which produces a basic clock pulse (Co) each time a final value (y) of the predetermined value range (Z') is reached; and a readjustment circuit (38) which produces the counter pulses (Zt) from the basic clock pulses (Co). In one embodiment on occurrence of the subsequent event (e3) the readjustment circuit (38) corrects the counter state (ZS) of the first counter (40,42) by forming a difference between a predetermined set value and the counter state (ZS) and feeding a number of high frequency correction signals (KS) equal to that difference into the first counter if the counter state is less than the set value or masks a number of counter pulses (ZT) equal to that difference if the counter state is more than the set value.

28 Claims, 2 Drawing Sheets

DEVICE FOR ELECTRONICALLY SIMULATING THE POSITION OF A COMPONENT

This application is a continuation of PCT/DE94/01011 filed Sep. 2, 1993 now abandoned.

BACKGROUND OF THE INVENTION

The invention relates to a device for electronically simulating the position of a component, in particular the angular position of a crankshaft. The device has a first counter whose counter state is a measure of the respectively assumed position of the component. The first counter counts counter pulses which are determined by the respective occurrence of a periodic event which in each case marks a position of the component.

Electronic counters are used in many technological fields. They serve for the quantitative detection of a continuously repeating process. The counting function is triggered here by applying an event-dependent clock frequency to the input of a counting circuit which is associated with the counter. For the execution of an event evaluation it is known to connect upstream for example a gate logic which permits selective masking out of individual counting clocks so that the counting circuit counts correspondingly more slowly. Furthermore, it is known to reduce the clock frequency by a permanently prescribed ratio by connecting upstream a frequency divider so that the counting circuit also counts correspondingly more slowly.

If such a counting circuit is used, for example when determining the present crankshaft position of an internal combustion engine, there are limits placed on the known counting circuits which only permit the crankshaft position to be broken down into relatively large angular increments. However, since it is very important to determine the angular position of crankshaft relatively accurately, in particular in order to break down control signals in downstream series control units for engine control, the extremely inaccurate control signals which can be generated with the known counting circuits are of little interest in practice.

SUMMARY OF THE INVENTION

It is an object of the present invention to provide an improved device for electronically simulating the position of a component, especially the angular position of a crankshaft or camshaft of an internal combustion engine, which does not have the above-described disadvantages.

According to the invention, this device comprises a first counter having a counter state indicative of the component position and means for counting a plurality of counter pulses determined by respective occurrences of a periodic event marking respective component positions; a second counter; a third counter connected to the second counter, wherein the second counter includes means for starting the third counter in response to occurrence of a first event and the third counter counts at a counting rate faster than the second counter so as to repeatedly run through a predetermined value range until occurrence of a subsequent event and the third counter includes means for producing a basic clock pulse each time a final value of the predetermined value range is reached, and a readjustment circuit connected to the third counter to receive the basic clock pulses and including means for making the counter pulses from the basic clock pulses. The readjustment circuit includes means for correcting the counter state of the first counter according to a predetermined set value. This correcting means comprises means for forming a difference between the predetermined set value and the counter state and means for inserting or masking out, according to the sign of the difference, a number of counting pulses corresponding to this difference by means of a correction signal.

The device according to the invention has, in contrast, the advantage that it is possible to refine the detection of the periodically occurring events so that an extremely accurate present event evaluation can take place. As a result, it is possible in particular when using the device in a unit for determining the present position of the crankshaft of an internal combustion engine to determine the instantaneous crankshaft angle very exactly and, by virtue of the corresponding, accurate electronic simulation of the present crankshaft angle, to provide a control signal to a downstream electronic control device for operating an internal combustion engine, preferably for an injection control and/or an ignition control. Since a second counter starts, as a function of the occurrence of a first event, a third counter which counts more quickly than the second counter and repeatedly runs through a prescribable value range until the occurrence of a subsequent event, and each time a final value of the value range is reached a pulse of a basic pulse which produces the counting clock is generated, it is very advantageously possible to transfer the period between the occurrence of two successive events, which period represents an angular base, into a time base and to refine the time base, and thus the periodically occurring events. In particular, this permits the running of a counter which electronically simulates the actual angular position to be determined by projection onto a subsequent expected event. Thus, a very high degree of accuracy with respect to the actual present crankshaft angle is achieved.

According to another embodiment of the invention, there is provision for the occurrence of the events to be evaluated for plausibility, in particular the events occurring between a present event and a subsequent expected event being masked out. This plausibility detection can be used to counteract the fault of an additional event, for example as a result of signal bouncing. By masking out the faulty events it is possible to prevent them influencing the counter which electronically simulates the actual crankshaft angle.

Further advantageous embodiments of the invention result from the other features specified in the subclaims.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
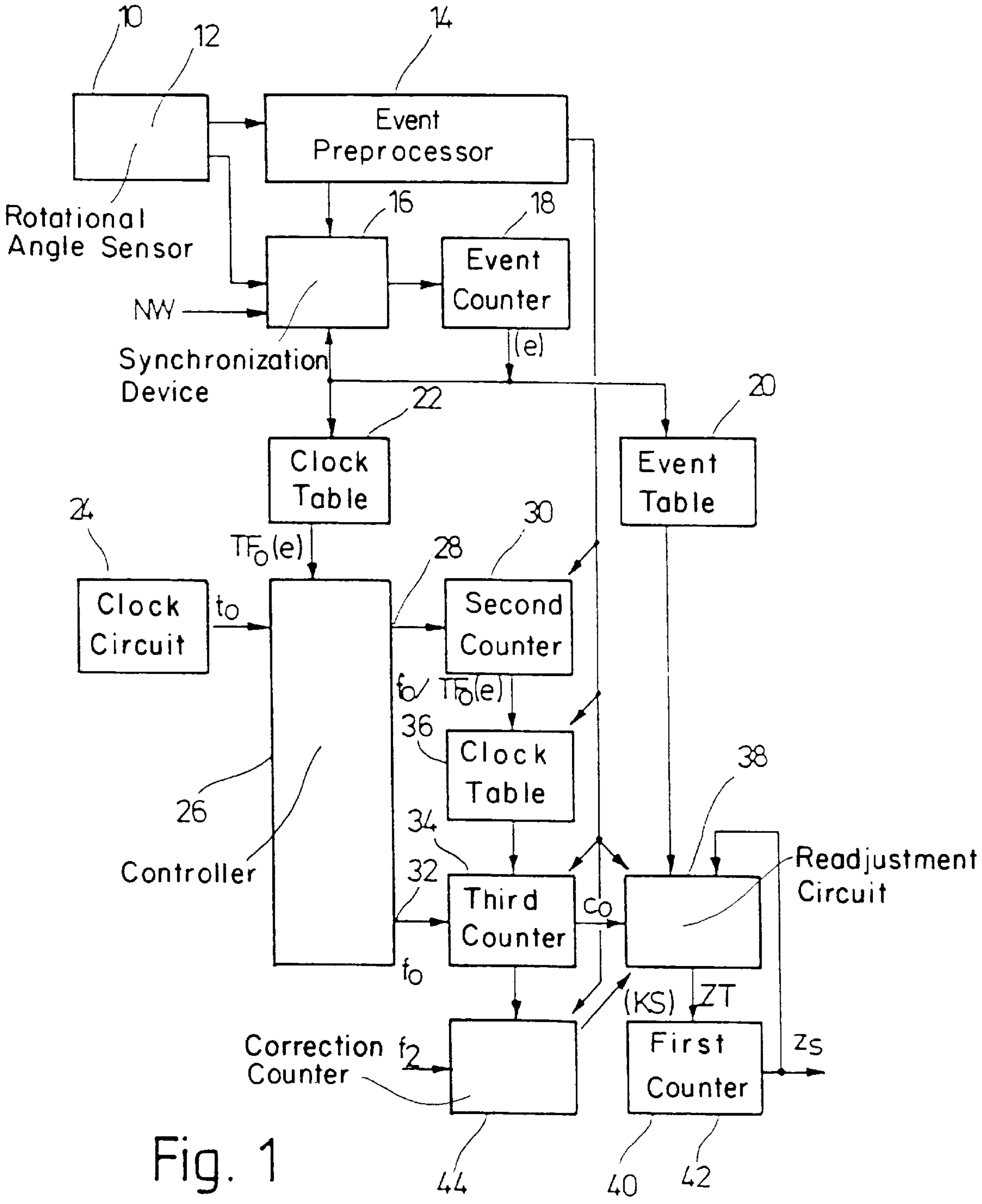
FIG. 1 is a block circuit diagram of an electronic counter circuit according to the invention.

The block circuit diagram illustrated in FIG. 1 has a sensor 10 which is constructed as a rotational angle sensor 12 and detects the angular position of a crankshaft (not illustrated) of an internal combustion engine. The sensor 10 forms here a digital signal of any desired periodic signal shape and is activated by a sensor wheel (also not illustrated)

which is arranged on the crankshaft. The sensor wheel has here equidistant teeth which are distributed over the circumference and a gap whose length corresponds for example to the omission of two teeth. Each of these teeth gives rise to a sensor signal and, furthermore, either the negative or the positive edges of the sensor signal are evaluated. The gap which is arranged on the sensor wheel is assigned to a fixed, precisely known crankshaft angle and gives rise to a synchronization signal-in each case. The occurrence of a digital signal brought about by a positive and/or negative signal edge is designated below as an event. In another embodiment of the invention, nonequidistant teeth and a plurality of tooth gaps can also be processed as can the evaluation of both the negative and positive sensor signal edges.

The events starting from the sensor 10 are fed to an event preprocessor 14. By means of the event preprocessor 14, a plausibility detection of the event edges is carried out in order to detect an erroneous additional event, for example as a result of signal bouncing. A large portion of the possible fault sources are filtered out of the input signal by means of the plausibility testing. Moreover, the events are fed to a synchronization device 16 which feeds the event signal to an event counter 18 and to an electronically readable event table 20 via the said event counter 18. One synchronization event takes place at the gap arranged on the sensor wheel once per revolution of the crankshaft, and thus per revolution of the sensor wheel. The synchronization event is detected by the synchronization device 16 which thus makes available one of the two possible synchronization angles as a function of the state of a camshaft signal transmitter (not illustrated) which produces a camshaft signal NW. This is necessary since for example in the case of a four stroke combustion engine the engine cycle is 720° of one revolution of the crankshaft.

The desired angle stored in the event table 20 is correspondingly overwritten with each new occurrence of a synchronization event. The event counter 18 counts the number of events occurring between two synchronization events and reports this number to the event table 20. Since the known number of teeth arranged on the sensor wheel also permits the angular adjustment which is to be respectively assigned to an occurrence of an event to be known, the event table 20 can be updated to the respective desired value. The event table 20 can be assigned a correction factor table (not illustrated here) which permits known speed of revolution-dependent delays of the electronic device for evaluating the sensor wheel to be corrected by using an additive factor. In addition to the event table 20, an event difference clock table 22 is indexed via the event counter state e and in each case the time between the last event and the present event is stored in it. Furthermore, a clock circuit 24 which supplies a constant frequency fo to a controller 26 is arranged. The frequency fo is divided with a divisor factor TFo which is obtained from the event difference clock table 22 so that an output frequency fo/TFo is present at a first output 28 of the controller 26. The divisor factor TFo can be indexed here by the event counter state e which is obtained from the event counter 18 in that the magnitude of the event counter state e can be freely prescribed by the time interval between two events as a gear speed signal. A second counter 30 which starts at a value of 0 and runs through a value range is counted with the frequency fo/TFo. The counter 30 is started by the occurrence of an event and stopped after the occurrence of the next event and reset to 0. The counter 30 thus assumes the function of performing a relative time measurement between the occurrence of the last event and the occurrence of the present event.

The frequency fo which is supplied by the clock circuit 24 is present at a second output 32 of the controller 26. A third counter 34 is counted with this frequency fo. The counter 34 is constructed here as an overflow counter and runs through a specific value range. The counter is reset again to the initial value after a final value is reached and runs through the value range again. Since the counter frequency fo which acts on the counter 34 is not evaluated with a divisor factor, the counter 34 counts more quickly than the counter 30.

The measurement of the time interval, realized by the counter 30, between the last event and the present event is stored in a clock table 36 which triggers a starting signal to the counter 34. With the occurrence of an event, the counter 34 is started here so that it runs through the predetermined value range with the frequency fo. A pulse of a basic clock Co is generated each time the value range is run through. With the registering of the latest event in the counter 30, the counter 34 is returned to its initial state via the clock table 36 so that the overflow counter begins to run through its counting periods again. Since, as already mentioned, the counter 34 counts more quickly than the counter 30, a plurality of basic clock pulses Co is generated within the time period of the occurrence of two successive events. By means of this arrangement of the counters 30 and 34, the timing scheme is thus refined. Since the counter 34 is reset to its initial state with the occurrence of the present event and a new basic clock frequency Co is generated starting from this time, a projection onto the next event takes place with the counter 34.

The basic clock pulse Co is fed to a readjustment circuit 38 which forms from it a counting clock pulse Zt with which a counting circuit 40, which in the example constitutes at the same time an angle timer 42 is supplied. The angle timer 42 freewheels here with the prescribed counting clock pulse Zt. The counting circuit 40 and the angle timer 42 form here a counter state ZS. The counter state ZS of the angle timer 42 simulates the rotational angle of a crankshaft in the example described. The rotational angle is simulated electronically in this way and can be fed to a downstream electronic control device. The readjustment circuit 38 is also connected to the event table 20 and to the angle timer 42 via a feedback branch. On each occurrence of an event, the readjustment circuit determines the difference between the desired value prescribed in the event table 20 and the actual counter state ZS of the angle timer and can synchronize the angle timer 42 in this way. For this purpose, the readjustment circuit 38 is connected to a correction counter 44 which is counted with a frequency f2 and can transmit a correction signal KS to the readjustment circuit 38. If the desired value stored in the event table 20 is equal to the counter state ZS of the angle timer 42, no synchronization takes place and the angle timer 42 runs with the counting clock pulse Zt which is equal to the basic clock pulse Co. Synchronization of the angle timer 42 takes place here whenever an event occurs. If the desired value of the event table 20 deviates from the counter state ZS, the following two variants of a synchronization are possible.

In a first variant, the counting circuit 40 or the angle timer 42 freewheels with the generated basic clock pulses Co or the counting clock pulses Zt until the desired value of the angle timer predetermined from the event table 20 is reached. In this process, a counting clock pulse Zt is generated at each basic clock pulse Co or at each n-th basic clock pulse Co. If the predetermined angle timer value from the event table 20 is reached, further counting clock pulses Zt are masked out and the counter circuit 40 remains at the counter state ZS associated with the expected event. By means of a monitoring counter (not illustrated here) which is reset whenever an event has occurred, the counting clock pulses which are masked out in this way and which result from the difference between the counting clock pulses Zt and the basic clocks Co can be added up in order to detect a failure of the sensor 10 when a prescribed maximum value is overrun. Furthermore, a loss of an event which occurs only once or dynamics of the rotational angle sensor 12 outside an expected definition range can be corrected in this way. The monitoring counter can be technically identical with the correction counter 44.

Ideally, an event is detected at the same time as the angle timer 42 counts to the identical counter state ZS which is predetermined by the desired value of the event table 20. If an event occurs before the angle timer 42 has reached this value, the angle timer 42 initially counts, with the maximum frequency f2 prescribed at the correction counter 44, to the corresponding desired value taken from the event counter 20. If this desired value is reached, the angle timer 42 continues to count normally with the counting clock pulses Zt. This determination of the angle timer difference, that is to say the difference between the desired value and the actual value and the insertion of a corresponding number of correction signals KS between the normal counting clock pulses Zt is unproblematic as long as the frequency f2 is sufficiently high. Since this variant does not have a feedback branch, it operates completely free of vibration. Furthermore, as a result of the prescribed maximum number of counting pulses Zt generated between two events, it is ensured that the angle timer 42 always remains in the proximity of the actual rotational angle known by means of the event table 20. An error of the angle timer 42 which is due to dynamics thus remains small and can be calculated and, if appropriate, taken into account in the counter state ZS. Since the angle timer counter state is always adapted in relation to the last measurement, that is in relation to the occurrence of the last event, a largely free dynamic variation of the rotational speed indicated by means of the rotational angle sensor 12 can be simulated electronically. The dynamics are limited here only by the hardware requirements and the maximum frequencies.

In a second variant, the angle timer 42 is continuously clocked with the counting clock pulses Zt generated from the basic clock pulses Co until the occurrence of the next event. At this time, the difference between the desired value read out of the event table 20 and the actual counter state ZS is formed and, as a result thereof, a correction is carried out. Ideally, this difference is exactly 0, namely when the counter state ZS corresponds to the actual desired angle. If, on the other hand, the angle timer 42 has run too far, a number of the following counting clock pulses Zt are masked out. The number of counting clock pulses Zt masked out corresponds exactly to the result of the aforementioned difference formation. If, on the other hand, the angle timer 42 has not yet reached the expected desired value, the negative difference of counting clock pulses Zt is, as already mentioned above, inserted with the prescribable maximum frequency f2. In this variant, there are also no vibrations since there is no feedback from the desired value/actual value comparison within the readjustment circuit 38 to the basic clock pulses Co generated by the counter. It is also conceivable for the two aforementioned variants to be combined to form one correction possibility, for example by means of a concept selection indexed by the event counter 18.

As a result of the fact that the events in the event preprocessor 14 are evaluated for its detection of plausibility edges, the counter 30, the clock table 36, the counter 34, the readjustment circuit 38 and the correction counter 44 are only supplied with a "cleaned" event signal so that events which are reported incorrectly, for example due to signal bouncing, are not taken into account. In the case of an event which is put through incorrectly, both variants react with a synchronization of the angle timer 42 displaced by one event. As a result of the reduced time difference between the false event and the previous or subsequent event, the counting clock Zt is increased strongly for a brief time. According to the first variant, the angle timer 42 can go wrong up to a maximum angle difference between three successive events. In the second variant, limitation can be achieved by means of the monitoring counter which has already been mentioned and which, after a prescribed maximum number of counting clock pulses Zt, masks out further counting clock pulses Zt without the occurrence of an associated event, and thus briefly switches over to the first variant.

However, if, on the other hand, instead of an additional incorrect event, an event fails to occur, in the second variant the angle timer 42 continues to run since this loss of an event is ignored. The counting clock pulses Zt are not lost until the subsequent event. Since the measurement phase became longer as a result of the loss of an event, the frequency of the counting clock pulses Zt is reduced to a corresponding degree and is only corrected again by the subsequent event, an incorrect synchronization which is displaced by one event remaining. Here, one conceivable correction possibility is if a corresponding circuit variant of the event table 20 can cause the actual value of the angle timer to be referred back not using the desired value but rather using the subsequent desired value.

In the first described variant, the angle timer 42 stops when an event is lost. After the occurrence of the next event it starts more slowly as a result of the lengthened measurement phase and is then also continuously synchronized incorrectly by one event. Here, correction possibilities are also conceivable in that the number of lost counting pulses Zt is referred back to the angle difference of the desired value and to the following desired value.

Figure 2:
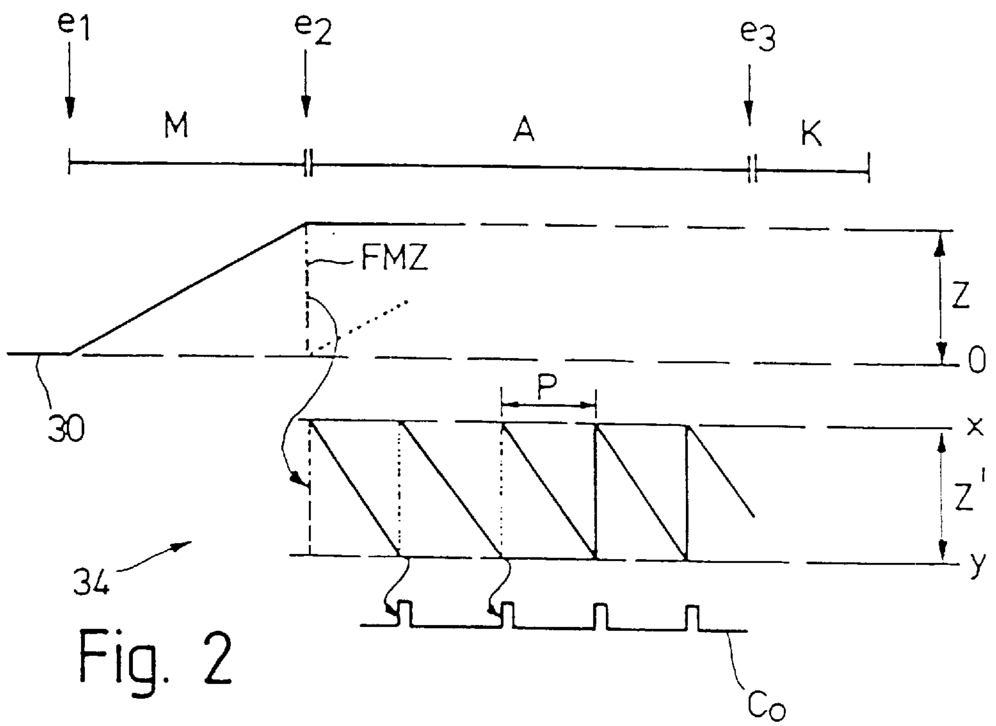
FIG. 2 is a graphical illustration showing basic clock pulses Co produced in the third counter according to the invention.

In FIG. 2, the generation of the basic clock pulse Co by means of the counters 30 and 34 is explained in greater detail. The occurrence of three successive events is illustrated with e1, e2 and e3. The counter 30 which is illustrated here by means of a characteristic line begins to run through a prescribable value range Z when the event e1 occurs. The counter 30 counts upward here, for example starting from the value 0. When the event e2 occurs, the counter has reached a specific value which is determined by the time difference between the last event e1 and the present event e2. The value range Z which the counter 30 runs through during the time constituting a measurement phase M between the occurrence of the events e1 and e2 is determined here by the frequency with which the counter 30 is counted. This clock frequency of the counter 30 can be varied here by the selection of a divisor factor, which is dependent on the duration of the measurement phase M and is designated in FIG. 1 by TFo, by means of a frequency division which is known per se. With the occurrence of the event e2, the counter 30 has reached its final value and it transmits this to the counter 34 and simultaneously starts the counter 34. The counter 34 begins to run through a value range Z', counting downward, as illustrated, from the initial value x which can be prescribed by the counter state of the counter 30 stored in the clock table 36 to a specific, prescribable final value y, preferably 0. When the final value y is reached, the counter 34 is automatically set back up to its initial value x and begins to run through its value range Z' again. Whenever the final value y is reached, that is whenever a counting period P is terminated, a pulse of the basic clock Co is generated. The counter 34 continues to run through its value range Z' until, as the result of the occurrence of a subsequent event e3, the counter 34 is reset to the initial state (corresponds to the state at the time of the occurrence of the event e2). In accordance with the time period corresponding to an evaluation phase A between the occurrence of the events e2 and e3, a specific number of pulses of the basic clock Co is generated. The basic clock pulse Co which is generated in this way is, as already described with reference to FIG. 1, fed to the readjustment circuit 38 and serves to form the counting clock pulse Zt which counts the angle timer 42. The evaluation phase A may be followed, if appropriate, by a correction phase K in which the correction counter 44 transfers the basic pulses Co which are still absent with respect to the desired angle from the event table 20 to the readjustment circuit 38. By means of this described counter arrangement, the counter 30 performs the relative measurement of time between the last event e1 and the present event e2 while the counter 34 performs the projection, with refined timing, onto the next event e3. At the moment at which the counter 34 begins to run through its value range Z' as a result of the occurrence of the event e2, the counter 30 can be reset simultaneously to its initial value 0 and thus a new subsequent measurement cycle FMZ can begin. These successive measurement cycles FMZ permit immediate influence to be exerted on the generation of the basic clock pulse Co when there is a change in the timing of the occurrence of the events e which simultaneously represent a change in the dynamics of the sensor wheel mentioned in FIG. 1 and thus in the crankshaft. This ensures that the state of the crankshaft which is ultimately simulated electronically by means of the angle timer 42 mentioned in FIG. 1 corresponds to the actual state of the crankshaft.

Figure 3:
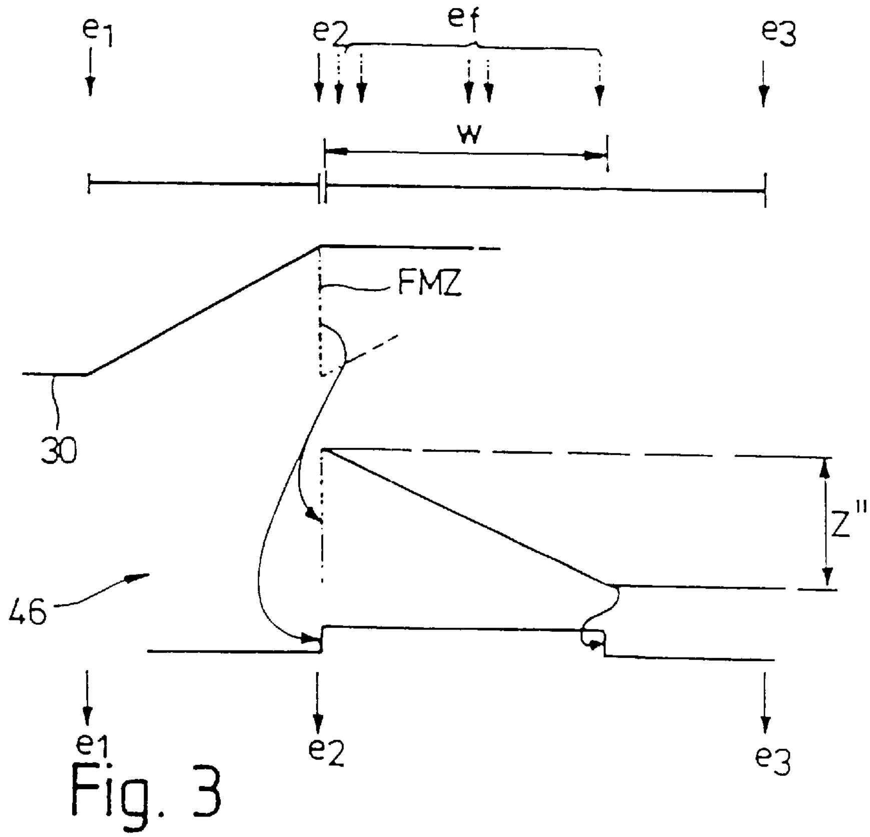
FIG. 3 is a graphical illustration of a plausibility check.

FIG. 3 illustrates the possibility of a plausibility check with which the events e1, e2 and e3 can be actually detected and possible incorrect events ef can be masked out. This is achieved in that each event e is assigned not only a known angle difference with respect to the next event e, which is known by means of the selected distance between the teeth on the sensor wheel, but also each event e is also assigned an angle difference W within which incoming events are not taken into account. With the known angle differences between the events or within an event, the expected times of the measurement phase M or of the evaluation phase A are also known from the measurement cycles FMZ. It is now possible to specify a specific angle difference W, and thus a specific time period, within which incoming events ef which can be caused for example by signal bouncing are ignored. This can be achieved in that when the evaluation phase A begins a counter 46 runs through a prescribable value range Z" within which incoming events which do not occur shortly after an event (e2) which is of interest are masked out. Thus, as a result of this counter circuit, only events e1, e2 and e3 which are still permitted are put through. This plausibility detection described here can be for example part of the event preprocessor 14 illustrated in FIG. 1. The presetting of the angle difference W within which incoming events are not taken into account can be derived as desired from the event counter 18, the event table 20, the event difference-clock table 22, the readjuster 38 or the correction counter 44. The value range Z" of the counter 46 must however be set here in such a way that the dynamics of the entire system are not too greatly restricted since it is expected that the event e3 which is the next to occur after the event e2 does not occur before the plausilibity counter 46 runs out.

In summary, the arrangement described in FIGS. 1 to 3 permits virtually any periodic digital sensor signal to be processed without further external interventions after a first initialization. As a result of the integrated plausibility detection and plausibility check, when applying the device in internal combustion engines sensor wheels can be used whose shapes may contain relatively large faults. For example, the use of cheap stamped sensor wheels instead of heavy sensor wheels with milled teeth is possible. The presettings used in the evaluation can either be permanently programmed or else subsequently added during operation in the case of variable, programmable event tables. As a result, extreme faults can be corrected with only a small reduction in the permitted dynamics, for example as a result of rust corrosion on the sensor wheel.

The digital sensor wheel evaluation permits angular ranges of even numbered multiples of the period of the input signal. As a result, the same input signal can be used both for a periodicity of 360° and for 720°. This is necessary if the crankshaft angle is also used as sensor angle in the case of a four stroke combustion engine. Alternatively, by means of a corresponding reprogramming of the event tables different sensor wheels can be used. In the event of a failure of a sensor wheel, for example either a sensor arranged on the camshaft or one arranged on the crankshaft can also be used for determining angles in internal combustion engines.

We claim:

1. A device for electronically simulating a component position, said device comprising a first counter (40,42) having a counter state indicative of the component position and means for counting a plurality of counter pulses (Zt) determined by respective occurrences of a periodic event marking respective component positions;

a second counter (30) and a third counter (34), wherein said second counter (30) includes means for starting said third counter (34) in response to occurrence of a first event (e2) and said third counter (34) counts at a counting rate faster than that of said second counter (30) so as to repeatedly run through a predetermined value range (Z') until occurrence of a subsequent event (e3) and said third counter (34) includes means for producing a basic clock pulse (Co) each time a final value (y) of the predetermined value range (Z') is reached; and a readjustment circuit (38) connected to said third counter (34) to receive said basic clock pulses (Co) and including means for making said counter pulses (Zt) from said basic clock pulses (Co), said readjustment circuit (38) including means for correcting said counter state (ZS) of said first counter (40,42) according to a predetermined set value;

wherein said means for correcting includes means for forming a difference between said predetermined set value and said counter state (ZS) and means for feeding a number of correction signals (KS) equal to said difference into the first counter when said counter state (ZS) is less than said predetermined set value on occurrence of said subsequent event (e3); and wherein said means for correcting includes means for masking a number of said counter pulses (ZT) if said counter state (ZS) reaches said predetermined set value prior to occurrence of said subsequent event (e3), wherein the counter pulses (ZT) are masked by said means for masking from a time at which said counter state reaches said predetermined set value until said subsequent event (e3).

2. The device as defined in claim 1, wherein the second counter (30) counts upward.

3. The device as defined in claim 1, wherein said third counter (34) counts downward.

4. The device as defined in claim 1, wherein said basic clock pulse (Co) is determined again by means for determining occurrence of a respective last two of said events.

5. The device as defined in claim 1, further comprising an event counter (18) including means for counting intervening events (e) occurring between periodically recurring synchronization events to obtain an event count and means for writing the event count into an event table (20).

6. The device as defined in claim 5, wherein said event table (20) loads an event difference clock table (22) which indexes a time interval between two successive ones of said events (e).

7. The device as defined in claim 6, wherein said event difference clock table (22) provides a divisor factor (TFo) and said second counter (30) includes means for counting at a divided frequency (fo/TFo), and further comprising a clock source (24) including means for generating an undivided frequency (fo) and means for dividing said undivided frequency (fo) by said divisor factor to obtain said divided frequency (fo/TFo).

8. The device as defined in claim 7, wherein said third counter (34) includes means for counting with said undivided frequency.

9. The device as defined in claim 8, further comprising a rotation angle sensor (12) including means for generating said events (e) according to a rotational position of a crankshaft of an internal combustion engine.

10. The device as defined in claim 8, further comprising a rotation angle sensor (12) including means for generating said events (e) according to a rotational position of a camshaft of an internal combustion engine.

11. The device as defined in claim 10, wherein said rotational angle sensor is an increment sensor system having a sensor wheel provided with a predetermined number of teeth arranged around a circumference thereof and with at least one tooth gap assigned to a predetermined angular position.

12. The device as defined in claim 11, wherein said teeth are uniformly distributed around said circumference.

13. The device as defined in claim 11, further comprising means for triggering a synchronization event responsive to said at least one tooth gap.

14. The device as defined in claim 10, wherein said rotational angle sensor is an increment sensor system having a sensor wheel provided with a predetermined number of segments arranged around a circumference thereof and respective segment starts and ends correspond to predetermined angular positions.

15. A device for electronically simulating a component position, said device comprising a first counter (40,42) having a counter state indicative of the component position and means for counting a plurality of counter pulses (Zt) determined by respective occurrences of a periodic event marking respective component positions;

a second counter (30) and a third counter (34), wherein said second counter (30) includes means for starting said third counter (34) in response to occurrence of a first event (e2) and said third counter (34) counts at a counting rate faster than that of said second counter (30) so as to repeatedly run through a predetermined value range (Z') until occurrence of a subsequent event (e3) and said third counter (34) includes means for producing a basic clock pulse (Co) each time a final value (y) of the predetermined value range (Z') is reached; and a readjustment circuit (2) connected to said third counter (34) to receive said basic clock pulses (Co) and including means for making said counter pulses (Zt) from said basic clock pulses (Co), said readjustment circuit (2) including means for correcting said counter state (ZS) of said first counter (40,42) according to a predetermined set value on occurrence of said subsequent event (e3);

wherein said means for correcting includes means for forming a difference between said predetermined set value and said counter state (ZS) and means for feeding a number of correction signals (KS) equal to said difference into the first counter when said counter state (ZS) is less than said predetermined set value; and wherein said means for correcting includes means for masking a number of said counter pulses (ZT) equal to said difference if said counter state (ZS) is more than said predetermined set value.

16. The device as defined in claim 15, wherein the second counter (30) counts upward.

17. The device as defined in claim 15, wherein said third counter (34) counts downward.

18. The device as defined in claim 15, wherein said basic clock pulse (Co) is determined again by means for determining occurrence of a respective last two of said events.

19. The device as defined in claim 15, further comprising an event counter (18) including means for counting intervening events (e) occurring between periodically recurring synchronization events to obtain an event count and means for writing the event count into an event table (20).

20. The device as defined in claim 19, wherein said event table (20) loads an event difference clock table (22) which indexes a time interval between two successive ones of said events (e).

21. The device as defined in claim 20, wherein said event difference clock table (22) provides a divisor factor (TFo) and said second counter (30) includes means for counting at a divided frequency (fo/TFo), and further comprising a clock source (24) including means for generating an undivided frequency (fo) and means for dividing said undivided frequency (fo) by said divisor factor to obtain said divided frequency (fo/TFo).

22. The device as defined in claim 21, wherein said third counter (34) includes means for counting with said undivided frequency.

23. The device as defined in claim 22, further comprising a rotation angle sensor (12) including means for generating said events (e) according to a rotational position of a crankshaft of an internal combustion engine.

24. The device as defined in claim 22, further comprising a rotation angle sensor (12) including means for generating said events (e) according to a rotational position of a camshaft of an internal combustion engine.

25. The device as defined in claim 24, wherein said rotational angle sensor is an increment sensor system having a sensor wheel provided with a predetermined number of teeth arranged around a circumference thereof and with at least one tooth gap assigned to a predetermined angular position.

26. The device as defined in claim 25, wherein said teeth are uniformly distributed around said circumference.

27. The device as defined in claim 25, further comprising means for triggering a synchronization event responsive to said at least one tooth gap.

28. The device as defined in claim 24, wherein said rotational angle sensor is an increment sensor system having a sensor wheel provided with a predetermined number of segments arranged around a circumference thereof and respective segment starts and ends correspond to predetermined angular positions.

* * * * *